Figure 1:
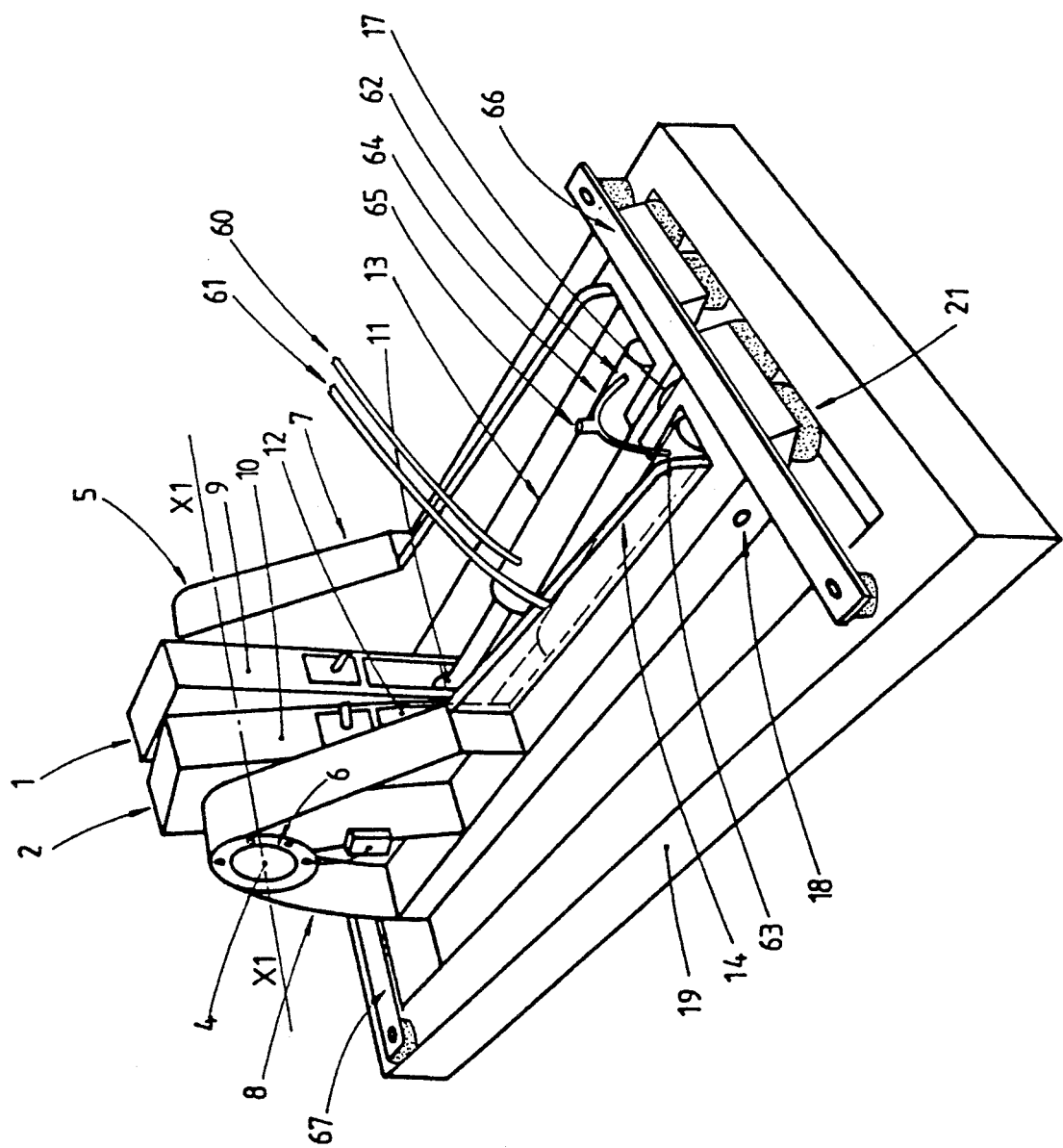

United States Patent [19]
Fradin et al.

[11] Patent Number: 5,153,975
[45] Date of Patent: Oct. 13, 1992

[54] APPARATUS FOR EFFECTING BEDDING-IN BY SCREWING AND UNSCREWING OF SCREWTHREADED JOINTS FOR THE ASSEMBLY OF TUBES

[75] Inventors: Louis Fradin, Aulnoye-Aymeries; Michel Meurant, Berlaimont, both of France

[73] Assignee: IDPA SA, Aulnoye Aymeries, France

[21] Appl. No.: 622,496

[22] Filed: Dec. 5, 1990

[30] Foreign Application Priority Data

Dec. 13, 1989 [FR] France .................. 89 17202

[51] Int. Cl.⁵ ........................................... B23P 19/04
[52] U.S. Cl. ..................................... 29/237; 29/240; 29/281.1; 29/283
[58] Field of Search .................. 29/237, 240, 240.5, 29/281.1, 281.5, 283

[56] References Cited

U.S. PATENT DOCUMENTS

| | | | |
|---|---|---|---|
| 2,755,840 | 7/1956 | Bartley | 29/240 |
| 2,878,026 | 3/1959 | Pioch | 29/240 |
| 3,039,181 | 6/1962 | Sawdey | 29/237 |
| 3,180,659 | 4/1965 | Vigneron | 29/237 |
| 3,382,559 | 5/1968 | Kopec et al. | 29/240 |
| 3,939,920 | 2/1976 | Hardiman et al. | 29/240 |
| 4,092,881 | 6/1978 | Jürgens et al. | 29/240 |
| 4,605,077 | 8/1986 | Boyadjieff . | |
| 4,697,830 | 10/1987 | Wood et al. . | |
| 4,836,064 | 6/1989 | Slator . | |

FOREIGN PATENT DOCUMENTS 1519086  7/1978  United Kingdom .

*Primary Examiner*—P. W. Echols
*Assistant Examiner*—David P. Bryant
*Attorney, Agent, or Firm*—Dennison, Meserole, Pollack & Scheiner

[57] ABSTRACT

An apparatus for performing at least one cycle of screwing and unscrewing of a screwthreaded joint for the assembly of tubes, which enables tightening of the joint with a high level of torque while avoiding damage to the screwthreads. The apparatus comprises two wrenches, each wrench engaging against a component of the joint, with each wrench comprising at least one mobile jaw which is slidable in a chamber. The mobile jaw is formed of a material which undergoes plastic deformation at the stress to which it is subjected in order to tighten or loosen the joint. This apparatus is used for bedding-in components of screwthreaded joints for tubes used in petroleum drilling operations.

12 Claims, 4 Drawing Sheets

APPARATUS FOR EFFECTING BEDDING-IN BY SCREWING AND UNSCREWING OF SCREWTHREADED JOINTS FOR THE ASSEMBLY OF TUBES

The apparatus and the process which are the subject-matter of the present invention concern the bedding-in of screwthreaded joints for the assembly of tubes. They concern in particular the components of the screwthreaded joints (also known as tool joints) which are mounted by welding to the ends of the tubular stems used for petroleum drilling operations.

In use those stems which each comprise a male end and a female end are subjected to numerous screwing and unscrewing cycles, being tightened on each occasion at a high level of torque. Experience has shown that, in the first cycles effected, in spite of the screwthreads being protected by suitable treatments such as copper-plating, coating with zinc powder or the like, the screwthreads are particularly liable to suffer damage, for example due to seizing or jamming in the screwing or unscrewing operation.

In order to eliminate those dangers, the current practice, before the tubular stems are brought into operation, is to effect a bedding-in operation with or without grease, which involves subjecting each of the screwthreaded ends of each stem to at least one screwing-unscrewing cycle including locking the joint at the end of the screwing operation by the application of a torque, the value of which is preferably greater than those which will be applied in use. Experience has shown that, by effecting that screwing operation in a precise fashion at a moderate speed of rotation and with the application of a progressive tightening torque, that eliminates in service seizing or jamming of and damage to the screwthreads. Moreover, locking the joint with the application of a torque greater than that used in a practical context creates a kind of surface work-hardening effect at the location of the screwthreads and the joint bearing surfaces, which reduces the subsequent risk of damage. The best results are obtained by effecting a plurality of screwing-unscrewing cycles with precise control in respect of the value of the torque involved, and by increasing same as the procedure progresses.

Those operations are made difficult by the length of the tubular stems, each being about ten metres in length. It is not always easy to arrange them in such a way that they are precisely aligned, generally in a horizontal position. The stems may also involve a slight degree of curvature which can be the cause of incorrect alignment of the male and female screwthreads, with damage to the screwthreads in the course of the screwing operation. Finally, effecting successive screwing-unscrewing cycles is accompanied by the formation of impressions of greater or lesser depth which are left by the jaws of the tightening wrenches on the outside surface of the end regions of the stems. In some cases the pressure of the jaws deforms the ends of the tubular stems and can also give rise to the formation of cracks.

Consideration was given to the possibility of providing an apparatus for effecting bedding-in of the screwthreaded joints of tubes, also referred to as tubular stems or rods, by effecting at least one screwing-unscrewing cycle which makes it possible to avoid the disadvantages of the known methods which have just been described above. Consideration was given firstly to the possibility of preventing permanent deformation of the ends of the tubes under the pressure applied by the jaws of the tightening wrenches. Consideration was also given to the possibility of eliminating the risks of local formation of impressions or incipient cracks under the effect of the teeth of said jaws. Consideration was also given to the possibility of providing for tightening at a given speed of the components of the screwthreaded joint, with the attainment of a locking torque involving a given maximum moment. Consideration was also given to the possibility of simplifying the conditions of performance of the screwing-unscrewing cycles required for bedding-in of the screwthreaded joints when the latter are of the type involving components which are fitted by welding to the ends of the tubes after machining.

The apparatus and the process which are the subject-matter of the invention make it possible to attain the desired result while avoiding the disadvantages of the known apparatuses.

The apparatus according to the invention makes it possible to effect bedding-in by screwing and unscrewing of the components of the screwthreaded joints for the assembly of metal tubes. The bedding-in operation can be effected when the components of the screwthreaded joints are fixed to the tubes to which they correspond. Preferably however the components of those screwthreaded joints, which are most often referred to as "tool joints", are bedded in by means of the apparatus according to the invention before being fitted by welding to the ends of the corresponding tubes, also referred to as tubular stems or rods. That apparatus makes it possible to effect at least one screwing-unscrewing cycle at each screwthreaded joint which has to be bedded in. It comprises two tightening wrenches of which one engages the male component and the other engages the female component of each joint. Each of said wrenches comprises engagement means for seizing the outside wall of the component which corresponds thereto and means for tightening said engagement means on said outside wall. At least one of said wrenches is connected to at least one means for rotational entrainment about the axis of the screwthreaded joint, which makes it possible to apply to the corresponding component a locking torque at the end of the screwing operation of given moment, and then an unlocking torque at the beginning of the unscrewing operation. Advantageously, each of the wrenches is connected to at least one means for rotational entrainment about the axis of the screwthreaded joint, making it possible to apply to the corresponding component a locking torque at the end of the screwing operation, of a given moment, and then an unlocking torque at the beginning of the unscrewing operation. In the situation in which there is only one wrench connected to a rotational entrainment means, the other wrench is kept fixed.

According to the invention the engagement means of each of said wrenches comprise at least one mobile jaw capable of sliding with a slight amount of clearance in a chamber whose side walls surround it, under the action of a thrust means which bears against the rear wall of said jaw, the front wall of which is of a profile adapted to that of the outside wall facing same of the component against which it applies the necessary pressure. That pressure is the one which makes it possible to apply to the component, by means of the wrench, a locking torque of a given value and then an unlocking torque, without substantial angular slippage of the jaw with respect to the component. In addition the basic material of the mobile jaw is to afford a resistance to plastic deformation which is lower than the stress created in the jaw by the thrust force required to prevent slippage under the effect of that moment.

Preferably the basic material of the mobile jaw is a solid organic polymer such as a plastic material, an elastomer or a polymer which combines the properties of a plastic material and an elastomer. Advantageously the solid organic polymer is reinforced by threads or fibers. In an advantageous alternative, it contains hard solid particles which are dispersed over the surface of the jaw facing the component or in the mass of the jaw in order to increase the coefficient of friction between the surface of the jaw and the surface of the component. The particles referred to may be for example of tungsten carbide in grain form. The order of magnitude of the size of the grains may be for example 1 mm.

Preferably the thrust means for the mobile jaw is at least one jack, the thrust plate or head of which, being in contact with the rear wall of the jaw, is engaged in the bottom of the chamber and slides in the interior thereof with a slight amount of clearance along its side walls. Preferably the mobile jaw co-operates with a fixed jaw, the two jaws being disposed on respective sides of the component of the screwthreaded joint within the chamber. Preferably also the fixed jaw is made of a material having a level of resistance to plastic deformation which is lower than the maximum stress to which it is subjected by the pressure applied to the component by the mobile jaw. That material is advantageously similar to that of the mobile jaw.

The rotational entrainment means for the wrench or each of the wrenches is advantageously formed by an arm which is fixed with respect to said wrench, the arm being radial with respect to the axis of the joint, the end of the arm being connected by a rod to at least one jack which makes it possible to rotate the arm in the screwing or unscrewing direction with a given maximum angular amplitude which may be for example 60°. The maximum moment of the torque applied by the jack is at least equal to the moment of the locking torque which has to be produced. Preferably the jack is hydraulic and is pivotally connected by one of its two ends to the end of the arm of the wrench and by way of the other end at a point of the structure which supports the bearing about which the wrench is rotatably mounted.

The apparatus comprises at least one means for indicating the moment of the torque applied to the screwthreaded joint by the wrenches. The indication means may be supplied by a signal which is a function of the pressure applied by the hydraulic fluid which acts on a jack connected to an arm. When the angle $\alpha$ formed between the radial arm of the wrench and the axis of the jack is variable in dependence on the angular displacement of the arm, a means for correction of the signal is preferably used so as directly to indicate the moment of the torque applied by the wrench, in accordance with the relationship $M = F \cdot \sin \alpha \cdot R$, M being the moment of the torque, F being the force applied by the jack and R being the radius of the arm of the wrench. When the arrangement uses two double-acting jacks, each actuating an arm of a wrench, the two jacks are advantageously disposed on the same side of the wrenches and only one jack at a time is advantageously supplied with high pressure fluid so as to cause displacement of the piston of that jack in the desired direction, and a permanent communication is made between the orifice disposed at the other end of the chamber of the jack and the corresponding orifice of the other jack in such a way as to cause synchronised displacement in the opposite direction of the piston of the latter. In order to reverse the displacement of the pistons of the two jacks, it is only necessary to change the direction of flow of the hydraulic fluid, supplying the second jack with the high pressure fluid, the flow of that fluid occurring by way of the orifice of the first jack by way of which the high pressure fluid was first injected. In this particular mode of actuating the jacks, the pressure source for supplying the signal transmitted to the means for indicating the moment of the torque applied is advantageously a pressure tapping on the communicating conduit between the two jacks.

The invention also concerns a process for effecting bedding-in of screwthreaded joints for the assembly of tubes, comprising effecting at least one cycle of screwing and unscrewing the components of said joint, which may or may not be fixed with respect to the tubular portions to which they correspond, in which process two wrenches are each engaged on a component and either the two wrenches being mobile or one wrench being fixed and the other being mobile, the wrenches are entrained with a relative movement in an opposite direction to lock or unlock the joint. In accordance with that process, to effect the engagement of each wrench on the component, use is made of at least one jaw accommodated in a chamber which closely surrounds it, the jaw being subjected to a stress such that, having regard to the material of which it is made, its limit in respect of resistance to plastic deformation is exceeded and said jaw applies a pressure which is distributed over the surface of the component with which it is in contact. Preferably a second fixed jaw is used, which is accommodated in the same chamber and the material of which has characteristics similar to those of the mobile jaw. For carrying out the bedding-in process according to the invention, it is also possible to envisage using a plurality of mobile jaws which are angularly distributed around the axis of each component of the screwthreaded joint and which are each subjected to pressure in a chamber. In order to limit the plastic flow or creep of the jaws to the outside of the chambers, it is necessary to minimise the clearance between the edges of the passage openings of the chambers and the outside surface of the components of the joint. Likewise, in order to control that plastic flow, the basic material selected for the jaws is a material which has a speed of creep limited to a suitable value under the operating conditions involved.

The following example and Figures provide a non-limiting description of a particular embodiment of the apparatus and the process according to the invention.

Figure 2:
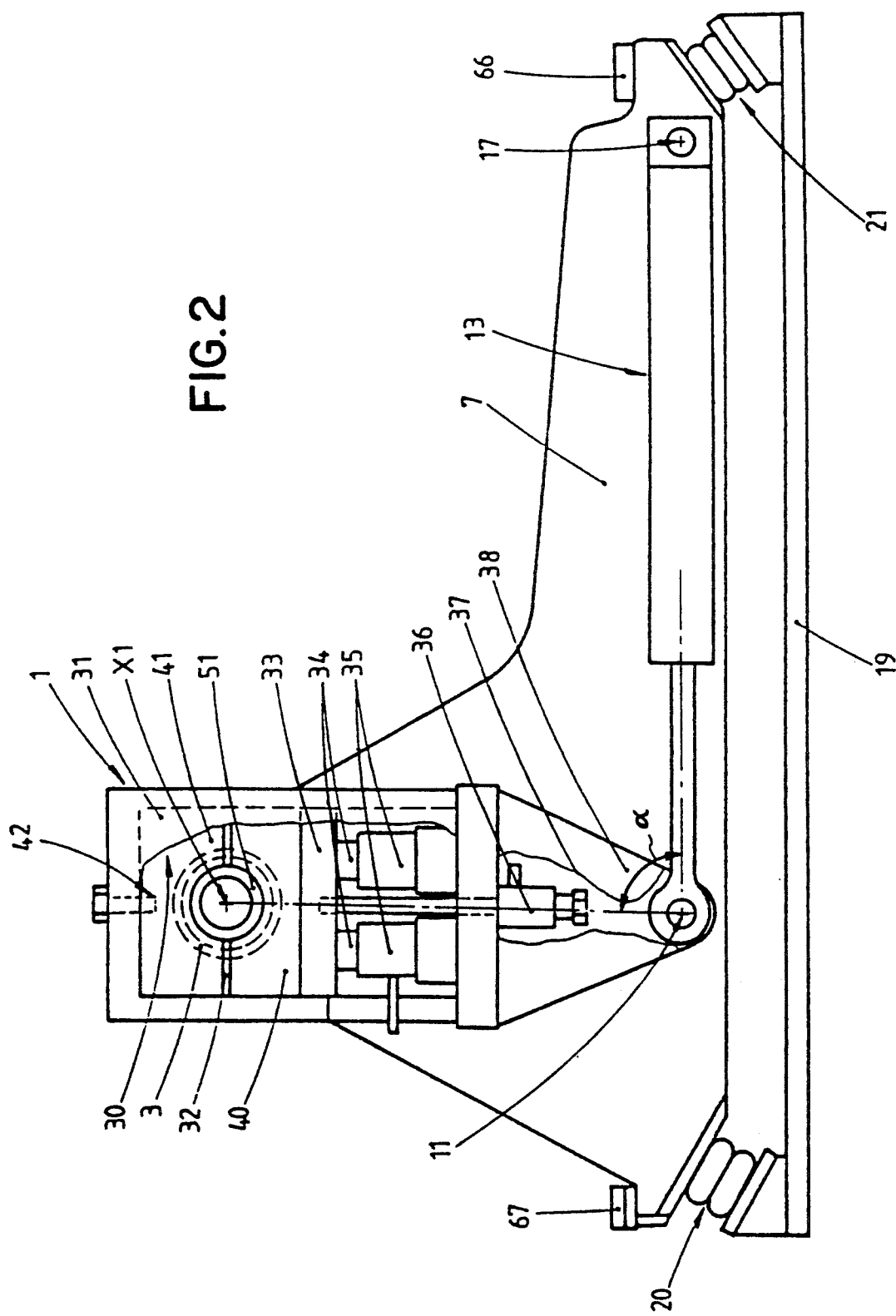
Figure 3:
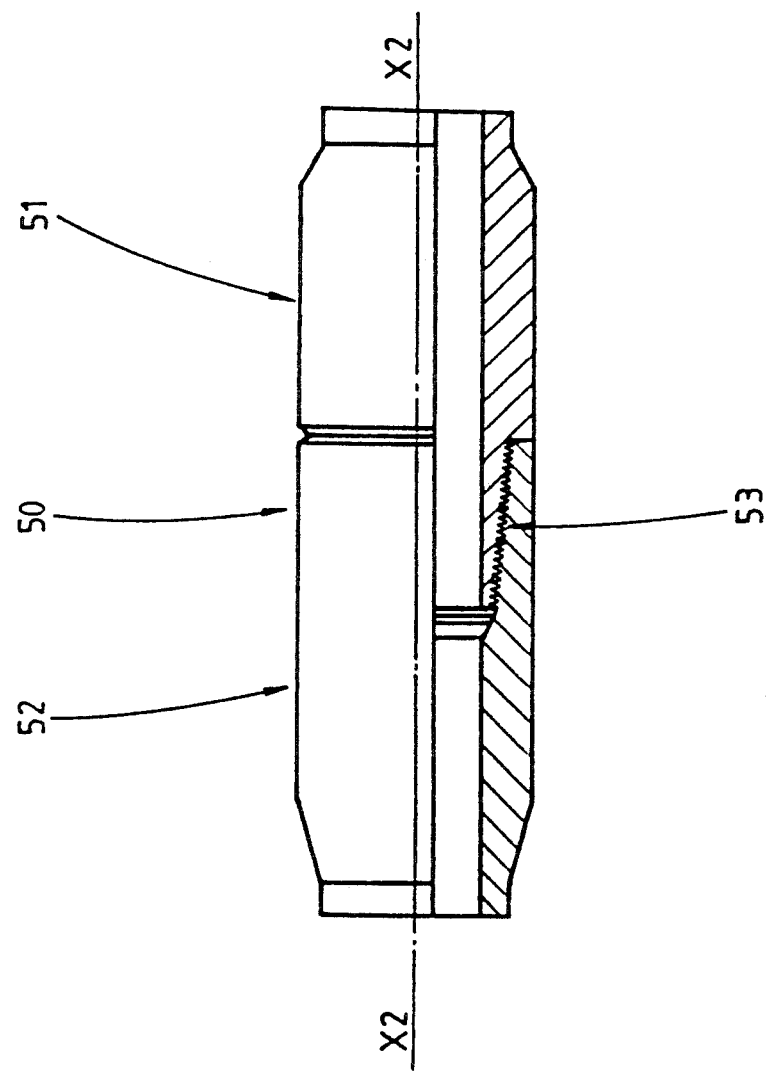
Figure 4:
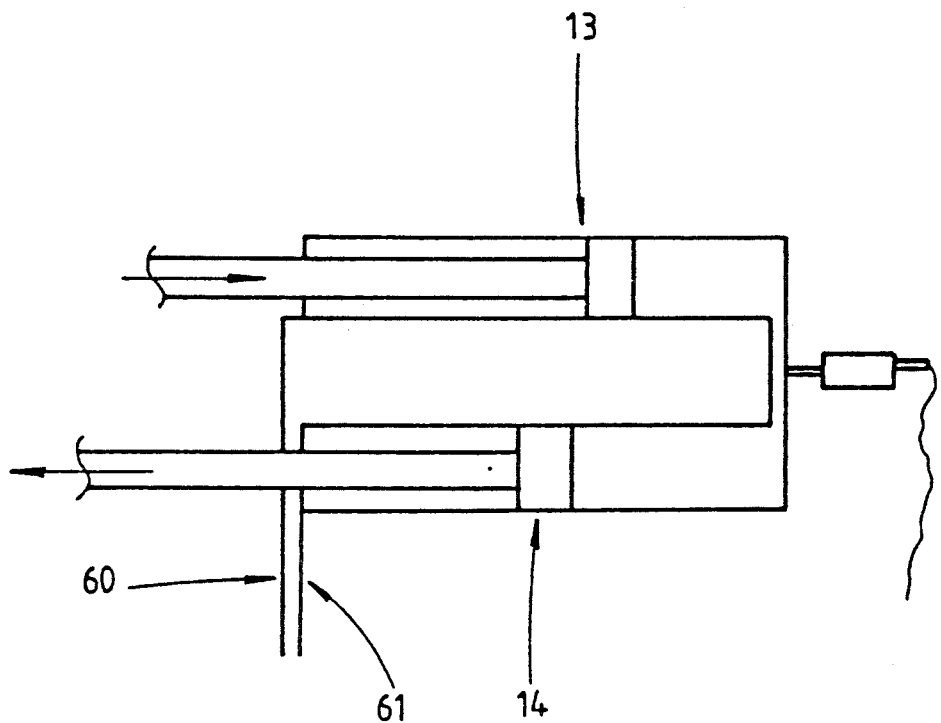

FIG. 1 is an overall perspective view of an embodiment of the apparatus according to the invention, FIG. 2 is an elevational view of a wrench of the apparatus according to the invention, FIG. 3 is a view of a screwthreaded joint which is bedded in by the process according to the invention, and FIG. 4 is a diagrammatic view of a particular mode of supplying the jacks for actuating the arms of the wrenches of the apparatus according to the invention.

Referring to FIG. 1, shown therein is an overall view of an embodiment of the apparatus for bedding in the components of screwthreaded joints, also referred to as tool joints, for tubes, which is more particularly suitable for the types of tubes referred to as rods or tubular rods, which are used for petroleum drilling operations.

The apparatus comprises two tightening wrenches 1 and 2 which are each provided with a hollow journal 3, 4 which is fixed with respect to the corresponding wrench, being mounted rotatably in the bearing-forming bore 5, 6 of a corresponding wrench support structure 7, 8. Each wrench is provided with an arm 9, 10 while pivotally connected to the end 11, 12 of the respective arm 9, 10 is one of the ends of an entrainment jack 13, 14. The other end of the jack is fixed pivotally about pivot axes at 17, 18 to the lower part of the wrench support structure 7, 8. The two wrench support structures 7, 8 themselves rest on a common chassis 19 by way of resilient support portions as indicated at 20 and 21 (see FIG. 2). In the rest condition, in the absence of stresses, the wrench support structures 7, 8 are fixed on the common chassis 19 in such a way that their bores 5, 6 have a common axis X1—X1. Under those conditions the two wrenches are disposed side by side, separated by a small spacing which varies in the course of tightening or loosening the two male and female components of a screwthreaded joint. The axial clearance required is provided so that the hollow journals 3, 4 can be axially displaced by the corresponding amount in the bores 5, 6.

FIG. 2 is an elevational side view of the wrench 1. A cut-out 30 in the side wall 31 of the chamber 32 of the wrench 1 shows the mobile and fixed jaws 40 and 41 surrounding the component 51 of the screwthreaded joint 50 (see FIG. 3). The walls of the chamber 32 are calculated to withstand the pressure which is transmitted thereto by the jaws 40, 41 when the latter exceed their limit of resistance to plastic deformation. The chamber 32 comprises an opening into which is engaged the thrust plate 33 which is pushed by the pistons 34 of two unidirectional jacks 35 which are mounted in side-by-side relationship and which apply their thrust force in an upward direction. A small return jack 36 provides for the return movement of the plate 33 and is made visible by the cut-out 37 in one of the two support arms 38 for the pivotal connection 11 of the jack 13. The upper fixed jaw 41 is fixed with respect to the upper wall of the chamber 32 by at least one retaining means such as the screw 42. The lower mobile jaw 40 is fixed with respect to the thrust plate 33 by suitable means (not shown). When it is brought into service, each of the jaws has a support surface of hollow cylindrical shape extending over a little less than 180°. The radius of those surfaces, before they come to bear against the component, is in the initial state preferably a little smaller than that of the outside surface of the component against which the jaws will apply their thrust force so that the arrangement provides a wedge effect when tightened around the component. The jaws may be made for example of polyamide such as ERTALON ® (trademark of the Belgian company ERTA-NV) or nylon.

To produce the jaws 40, 41, use is made of a plastic material having a relatively high level of resistance to creep while retaining a sufficient degree of ductility and affording a sufficiently high coefficient of friction for transmitting the torque applied by the jack 13, without slippage, to the corresponding component. The tightening pressure applied by the jaws 40, 41 under the effect of the jacks 35 is adjusted in dependence on the moment of the tightening torque which is to be produced. In the case of the screwthreaded joint 50 with its axis X2—X2, the components 51 and 52 have taper screwthreads 53 (see FIG. 3). This joint involves components which are intended to be fitted by welding to the ends of the corresponding tubular rods. In most cases, a pre-screwing operation is effected, involving a very low level of torque, prior to the locking operation. The joint, whether pre-screwed or not, is introduced into the passage provided in the apparatus, the inside diameters of the hollow journals 3, 4 and those of the openings which are centered on the axis X1—X1 in the walls such as 31 of the chambers such as 32 being defined for that purpose. The openings in the walls of the chambers leave only a small clearance for the components to pass therethrough. In addition each component must project by means of its cylindrical portion to the outside of the chambers such as 32 in order to maintain that slight clearance when the thrust force of the jaws is brought to its maximum value. As shown in FIGS. 1 and 4, a particular method of actuating the jacks which entrain the wrenches is advantageously used.

In accordance with that method, a high pressure fluid supply means (not shown) is connected by a distributor means (not shown) to one of the two orifices 60 or 61 for the introduction or discharge of fluid. The other orifice 61 or 60 is connected to the conduit for returning fluid to the high pressure pump (not shown). The other two orifices 62 and 63 disposed at the ends of the jacks adjacent to their axes 17 and 18 at which they are pivotally mounted to the chassis 19 are connected together by a communicating conduit 64 at which, by way of the conduit 65, the pressure signal which contributes to operation of the means for indicating the moment of the torque applied to the joint 50 is taken off. It will be seen that, when the high pressure fluid enters by way of the orifice 60, the wrenches are entrained by the jacks in the direction of screwing (for a step motion to the right). In order to give the maximum travel distance, the jacks 13 and 14 are first supplied with fluid by way of the orifice 61 in the unscrewing direction, without the wrenches being engaged against the component. The wrenches are then moved into the condition of engaging the components 51 and 52 of the joint 50 by action of the pistons such as 34 of the jacks such as 35 against the mobile jaws such as 40, and finally the jacks 13 and 14 are supplied with fluid by way of the orifice 60 in the screwing direction. The fluid pressure at the inlet is adjusted until the level of pressure in the communicating conduit 64 reaches the desired value. It will be noted that the arrangement thus provides a total screwing angle of 120° without the arms of the wrenches exceeding an inclination of 30° with respect to the vertical; the corresponding angle $\alpha$ not being less than 60°, the sin $\alpha$ is not lower than 0.866. Such a screwing angle is generally sufficient to provide for locking of such a pre-screwed joint, at a high level of torque. If it is insufficient, the screwing operation can be continued. If the moment envisaged in terms of the locking torque is attained, it will be seen that, by alternating the introduction of high pressure fluid by way of the orifices 60 and 61, it is easy to effect a plurality of cycles for locking and unlocking of the joint 50. It is noted that the forces applied by the jacks, in particular at the location of the pivotal mountings 17 and 18, are absorbed by the chassis 19 by virtue of retaining bars 66 and 67 which are fixed with respect to the chassis and the resilient support components as indicated at 20 and 21 which perform a damper function.

A very large number of alterations and modifications may be made in the apparatus and the process according to the invention, without departing from the scope thereof. In particular although the described example relates to screwthreaded joints with a taper screwthread which are not yet fitted on the corresponding tubular rods, it will be appreciated that the apparatus and the process are applied to all types of taper or cylindrical screwthreaded joints for tubes, whether those joints are or are not fixed with respect to the tubes which correspond thereto.

We claim:

1. Apparatus for completing a screwing operation and initiating an unscrewing operation, in the assembly and disassembly of a metal tubular joint comprising a male threaded component and a female threaded component;

said apparatus comprising:
two wrenches (1,2), each of said wrenches comprising an engagement means for engaging a respective component of the joint; and
a rotational entrainment means connected to at least one of said wrenches for causing rotation of said at least one of said wrenches and a respective component engaged thereby about the mutual axis (X1—X1), for applying to the joint a screwing torque required to achieve locking of the joint at the completion of a screwing operation, or unlocking of the joint at the initiation of an unscrewing operation,
each engagement means comprising a chamber (32) having side walls (31) surrounding a respective component of the joint, at least two jaws (40,41) in said chamber for engaging the component, at least one of said jaws being a mobile jaw (40) having a front wall which is applied against the component and a rear wall, and which mobile jaw slides with a small amount of clearance within said chamber to engage the component,
said apparatus further comprising a thrust means (33,34,35) which applies a thrust force against said rear wall for sliding said mobile jaw against its respective component on its outer surface, thereby creating stresses in said mobile jaw,
said mobile jaw being formed of a material which undergoes plastic deformation under the stresses created in said mobile jaw, thereby causing said mobile jaw to conform to the shape of the component and apply a pressure to the outer surface of the component, which is distributed over the outer surface of the component, so as to prevent angular slippage of said mobile jaw on the component under any application of screwing torque.

2. Apparatus according to claim 1 wherein each of the wrenches is connected to a rotational entrainment means screwing completion.

3. Apparatus according to claim 1 or claim 2 wherein the basic material of the mobile jaw (40) is a solid organic polymer.

4. Apparatus according to claim 3 wherein the solid organic polymer is a plastic material or an elastomer or a polymer combining the properties of a plastic material and an elastomer.

5. Apparatus according to claim 3 wherein the solid organic polymer contains at least one additive in the form of discontinuous wires or threads or fibres.

6. Apparatus according to claim 3 wherein the solid organic polymer contains at least one additive in the form of solid particles for increasing the coefficient of friction between the front wall of said mobile jaw and the component, said solid particles being dispersed either over the surface of the jaw facing the component or in the mass of the jaw.

7. Apparatus according to claim 1 or 2 wherein the thrust means of the mobile jaw comprises at least one jack (35) having a thrust plate (33) slidable within the chamber (32) with a small amount of clearance and which bears against the rear wall of the mobile jaw (40).

8. Apparatus according to claim 1 or 2 wherein the mobile jaw (40) co-operates with a fixed jaw (41), the two jaws being within the same chamber (32) on respective sides of the component (51).

9. Apparatus according to claim 8 wherein the fixed jaw (41) and the mobile jaw (40) have plastic deformation properties which are substantially the same.

10. Apparatus according to claim 1, wherein said rotational entrainment means comprises an arm (9,10) having one end thereof connected to a respective wrench and an opposite end thereof pivotally connected to a hydraulic jack (13,14), whereby movement of the jack along its axis causes rotation of the wrench and the component engaged thereby about the axis (X1—X1) of the component.

11. Apparatus according to claim 10, additionally comprising means for determining the amount of torque applied to the joint according to the formula $M = F \cdot \sin \alpha \cdot R$, where M is the amount of torque, F is the force applied by the jack, R is the radius of the arm as it rotates, and $\alpha$ is the angle between the arm and the axis of the hydraulic jack,
wherein said means for determining comprises means for determining the hydraulic fluid pressure in the jack, and means for determining the angle $\alpha$ between the arm and the axis of the jack.

12. Apparatus according to claim 10, wherein each wrench is connected to a rotational entrainment means comprising an arm (9,10) connected to a hydraulic jack (13,14), each hydraulic jack comprising an orifice means (60,61) for selective introduction or discharge of fluid and a fluid interconnection means (64) located at an end of the jack opposite the connection to an arm, whereby fluid is introduced to one said hydraulic jack through its orifice means, passes through said interconnection means, and is discharged through the orifice means of the other said hydraulic jack, in order to control the screwing or unscrewing of a joint.

* * * * *